Sept. 1, 1959 P. D. ROCKWELL ET AL 2,902,596

TRANSCEIVER FOR MULTI-CHANNEL RADIO COMMUNICATION SYSTEMS

Filed June 11, 1953 3 Sheets-Sheet 1

PAUL D. ROCKWELL
JAMES O. STEPHENSON
DAVID D. BABB
*INVENTORS*

BY

Killman and Kerst
ATTORNEYS

Sept. 1, 1959 P. D. ROCKWELL ET AL 2,902,596

TRANSCEIVER FOR MULTI-CHANNEL RADIO COMMUNICATION SYSTEMS

Filed June 11, 1953 3 Sheets-Sheet 2

PAUL D. ROCKWELL
JAMES O. STEPHENSON
DAVID D. BABB
*INVENTORS*

BY

Killman and Kerst
ATTORNEYS

TRANSCEIVER FOR MULTI-CHANNEL RADIO COMMUNICATION SYSTEMS

Filed June 11, 1953 3 Sheets-Sheet 3

PAUL D. ROCKWELL
JAMES O. STEPHENSON
DAVID D. BABB
*INVENTORS*

*BY*

Killman and Kerst
ATTORNEYS

United States Patent Office 2,902,596

Patented Sept. 1, 1959

2,902,596

TRANSCEIVER FOR MULTI-CHANNEL RADIO COMMUNICATION SYSTEMS

Paul Daniel Rockwell, Towson, and James O. Stephenson, Baltimore, Md., and David Daniel Babb, Troy, N.Y., assignors to Bendix Aviation Corporation, Towson, Md., a corporation of Delaware Application June 11, 1953, Serial No. 361,042

11 Claims. (Cl. 250—13)

This invention relates to apparatus for transmitting and receiving radio communication signals over a large number of preassigned frequency channels.

It is an object of this invention to provide such an apparatus which makes economical use of circuit components by utilizing a considerable number of them for both transmitting and receiving.

It is another object of the invention to provide such an apparatus which is crystal controlled and which makes economical use of crystals by utilizing each of them for the control of the apparatus on more than one frequency.

It is a further object of the invention to accomplish channel selection from a remote location with a minimum of interconnecting conductors.

It is still another object of the invention to tune such an apparatus to a newly selected frequency in response to a signal from the remote location by mechanism which is simple, reliable and accurate.

It is a still further object of the invention to simplify the mechanical design of such an apparatus by providing tuning capacitors for the R.F. tuned circuits which have a useful rotation of 180 degrees, rather than the usual 165 to 175 degrees of calibrated motion.

It is another object of the invention to still further simplify the mechanical design of such an apparatus by providing I.F. tuning capacitors which operate over a full 360° of rotor rotations, thus eliminating the necessity for complex mechanical linkage in the ganging of the I.F. tuning function with the selection of I.F. determining crystals.

The above and other objects and advantages of the invention are realized by apparatus utilizing a double heterodyne receiver and in which a plurality of crystals cut respectively to frequencies which are uniformly and widely spaced (for example, by one megacycle intervals), are selectively switched by remote control into the first I.F. oscillator circuit of the receiver, to establish the first I.F. frequency. Each of these crystals is used to establish two frequencies, being beat with a higher R.F. frequency to establish the first I.F. for one of the higher channels and being beat with a lower frequency differing by the same amount to establish the first I.F. for one of the lower channels.

The frequency of the second I.F. oscillator is determined by a second set of crystals cut to frequencies separated by a simple fraction (for example, one-tenth), of the frequency spacing of the first set.

The selection of frequency determining crystals for both transmitter and receiver is determined by two switching systems of the open-seeking re-entrant variety. The first of these systems controls the selection of the first set of crystals (separated by a whole megacycle in frequency) and the tuning of the tuned circuits of the power amplifier of the transmitter, and the R.F. amplifier, first I.F. oscillator and first I.F. mixer of the receiver, to whole megacycle frequencies. The second of the systems controls the selection of the second set of crystals (separated by a tenth megacycle in frequency), controls the tuning of the first I.F. amplifier and controls the tuning of the power amplifier circuits of the transmitter and the R.F. amplifier and first I.F. mixer circuits of the receiver, to tenth megacycle settings.

Each of these switching systems has a rotary selector switch located in a remote control station and controlling a rotary follower or slave switch at the transceiver. The follower, when not in correspondence with the selector, completes a motor energizing circuit which is broken when coincidence between selector and follower is achieved.

The motor drives the crystal turrets and tuning mechanism through a mechanical drive which produces a coarse and a fine rotational output. The coarse output drives the one megacycle crystal turret and the tuning capacitors for the power amplifier circuits of the power amplifier of the transmitter, and the R.F. amplifier, first I.F. oscillator and first I.F. mixer of the receiver. This output also drives the rotor of the follower of the first switching system to reposition it.

The fine output drives the crystal selector for the tenth megacycle crystals and controls the tuning of the first I.F. amplifier. It also, through a differential mechanism, controls the tuning of the power amplifier circuits of the transmitter and the R.F. amplifier and first I.F. mixer of the receiver to tenth megacycle settings. Finally, it drives the rotor of the follower of the second switching system to reposition it.

The differential mechanism incorporates a translatable worm gear which is rotationally driven to produce the coarse positioning of a driven gear and translated along its axis to produce the fine positioning settings.

There are twice as many positions in the first switching system as there are crystals in the one megacycle crystal turret, with the result that for a full rotation of the selector switch of this system, each crystal of the turret is connected twice.

Only one half of the R.F. tuning capacitor rotor rotation is used in tuning through the transceiver frequency range. When the whole megacycle selector switch is turned clockwise through its entire range of settings this rotor is turned through 180 degrees. Since the selector switches are arranged for continuous rotation, it is necessary to turn the rotor through its remaining 180 degrees of rotation when switching from the highest frequency setting of the system to the lowest. Means are provided for accomplishing this rotation.

Due to the fact that the whole megacycle crystals are used twice in tuning through the frequency range of the transceiver, being used once with high-side injection in the lower half of the range and being used once with low-side injection in the higher half of the range, the first I.F. will decrease for increasing tenth megacycle increments between each pair of megacycle settings in the lower half of the range, and will increase under the same circumstances in the upper half of the range. In order that the second I.F. remain constant through the range, it is required that corresponding sequence reversals of the tenth megacycle crystal selection and I.F. capacitor positioning also occur. To meet this requirement, the tenth megacycle follower switch is divided into two ten position sections, ten of which are used over 180 degrees for high-side injection and the remaining ten of which are used over the remaining 180 degrees for low-side injection. When the injection is changed from high-side to low-side, or vice versa, a switch in the whole megacycle re-entrant system connects a different half of the tenth megacycle follower switch into the tenth megacycle re-entrant system. The two halves of the follower switch are wired so that the crystal selection and I.F. tuning capacitor positioning result in second oscillator injection frequencies and first I.F. signal frequencies which, when mixed, produce the desired constant second I.F. over the whole range.

Figure 1:
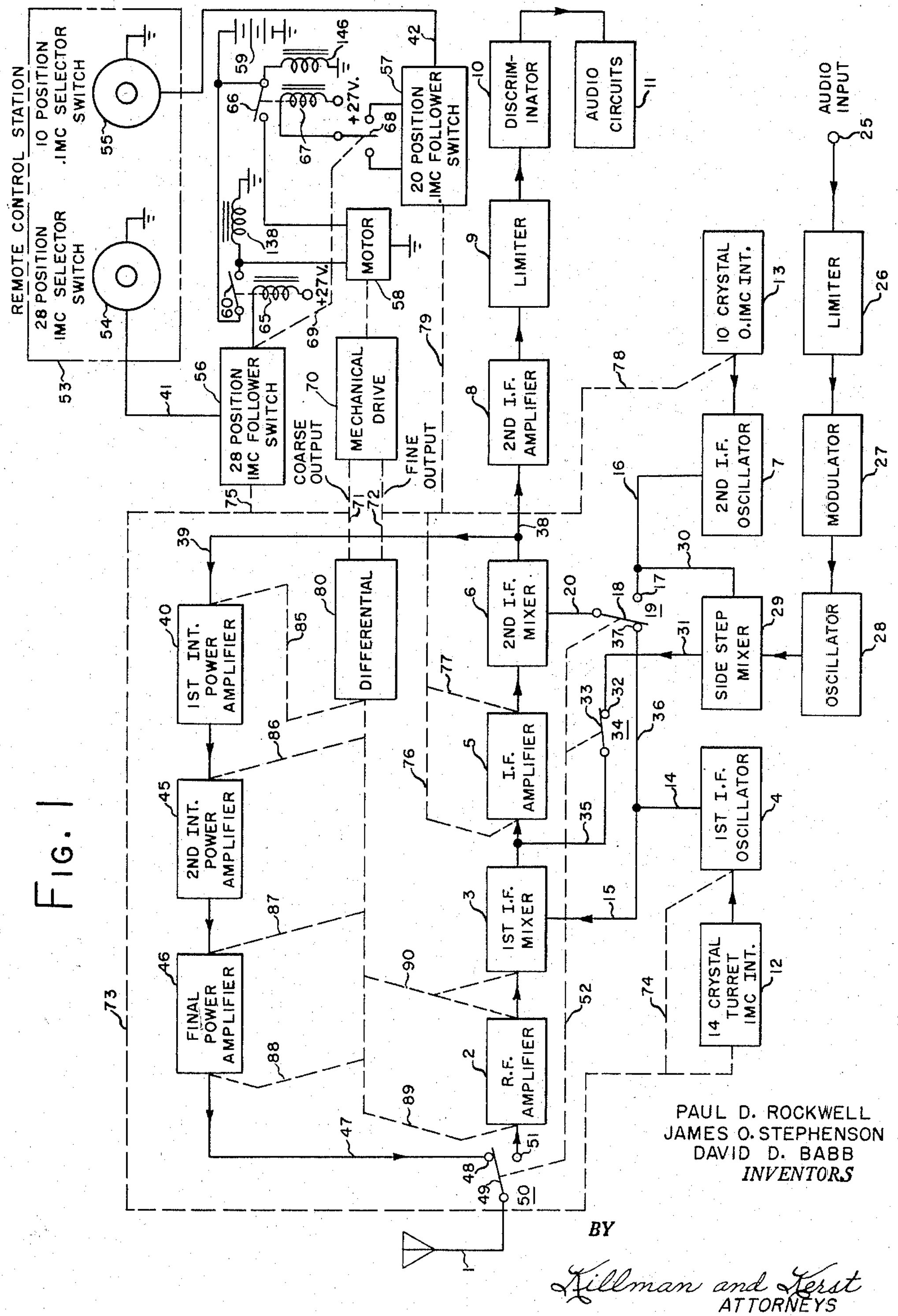
Fig. 1 is a block diagram of a transceiver embodying the invention.
Figures 2, 7:
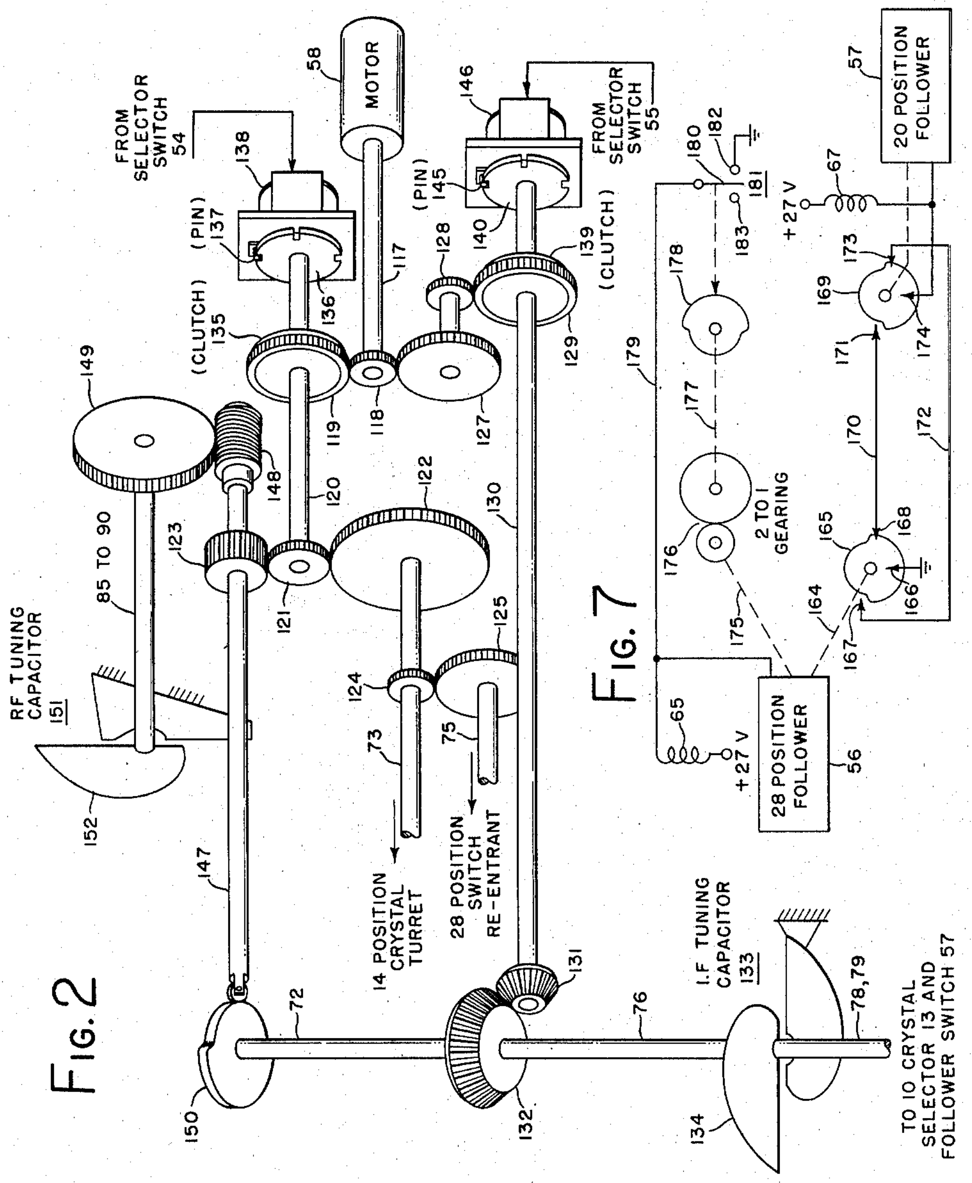
Fig. 2 is a perspective view of the mechanical drive and differential of the system of Fig. 1.
Figure 6:
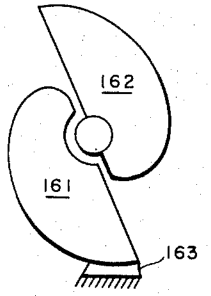

Fig. 6 is an elevational view of an I.F. tuning capacitor utilized in the system of Fig. 1; and Fig. 7 is a schematic circuit diagram of the switching arrangement for switching between halves of the 20 position follower switch when whole megacycle crystal frequency injection is changed between high-side and low-side. The figure also shows the means for rotating the whole megacycle follower through a complete revolution and the R.F. tuning capacitors through a half revolution in switching the whole megacycle selector switch continuously through the highest frequency channel to the lowest.

Referring now to Fig. 1 of the drawing, there is disclosed a transceiver utilizing an antenna 1 for both transmission and reception. The receiver portion comprises an R.F. amplifier 2, a first I.F. mixer 3, a first I.F. oscillator 4, a first I.F. amplifier 5, a second I.F. mixer 6, a second I.F. oscillator 7, a second I.F. amplifier 8, a limiter 9, a discriminator 10 and audio circuits indicated by the box 11.

By way of example, the transceiver may be regarded as tunable to 280 frequency channels separated by tenth megacycle intervals. The receiver is tuned to these frequencies, in a manner which will be later described, by the use of 14 crystals cut to frequencies separated by one megacycle intervals and mounted on a 14 crystal turret, indicated by the block 12, and providing injection frequencies for the first I.F. oscillator 4. Injection frequencies for the second I.F. oscillator 7 are provided by 10 crystals cut to frequencies separated by a tenth of a megacycle and incorporated in a crystal selecting mechanism indicated by the box 13.

The output of the first I.F. oscillator 4 is applied to the first I.F. mixer 3 by a conductor 14 and a branch conductor 15. The output of the second I.F. oscillator 7 is applied to the second I.F. mixer 6 through a conductor 16, the fixed contact 17 and switch arm 18 of a transmit-receive switch 19, and a conductor 20.

The audio input to the transmitter is indicated by a terminal 25. This input is applied to a limiter 26 and thence to a modulator 27 modulating the output of an oscillator 28, which output is applied to a side-step mixer 29. The output of the second I.F. oscillator 7 is also applied to this mixer by way of conductor 16, terminal 17 and a conductor 30.

The output of the side-step mixer 29 is applied by way of a conductor 31, the fixed terminal 32 and switch arm 33 of a transmit-receive switch 34, and a conductor 35 to the first I.F. amplifier 5.

The output of the first I.F. oscillator 4 is applied by way of conductor 14, branch conductor 36, fixed terminal 37 and switch arm 18 of transmit-receive switch 19, and conductor 20 to the second I.F. mixer 6. The output of this mixer is applied to the power amplifier chain of the transmitter through a conductor 38 and a branch conductor 39. The power amplifier chain comprises the first intermediate power amplifier 40, the second intermediate power amplifier 45 and a final power amplifier stage 46. The output of this latter stage is applied to the antenna 1 by way of a conductor 47, a fixed terminal 48 and the switch arm 49 of a transmit-receive switch 50. Connection of the antenna to the R.F. amplifier tube of the receiver circuit is accomplished by way of the same switch through fixed terminal 51.

Transmit-receive switches 19, 34 and 50 are ganged as indicated by the chain line 52 and may be operated from a remote location by any desirable conventional means which are not shown.

A remote control station for the control of the transceiver is indicated by a dashed line box 53. In this station are located a 28-position selector switch 54 utilized for the selection of 28 frequency channels, spaced by one megacycle intervals, and a 10-position selector switch 55 utilized for selecting frequency channels intermediate those selected by switch 54 and separated by tenth megacycle intervals. Each of these selector switches is a part of a re-entrant switching system such as is disclosed in the copending application of George I. Hatfield, U.S. Patent No. 2,796,574, issued June 18, 1957, and entitled "Re-entrant Switching Systems." The selector switches are continuously rotatable as indicated in that application. The switch 54 is connected to a 28-position follower or slave switch 56 located at the transceiver. The selector switch 55 is connected to a 20-position follower switch 57 also located at the transceiver. The connections between these respective selector and follower switches are indicated symbolically as single conductors 41 and 42, although a plurality of conductors will be required as indicated by the above identified application.

A motor 58 is provided at the transceiver for operating the crystal turret 12, crystal selector 13, and the tuning elements of the transceiver. The energizing source for the motor is indicated by the battery 59. The motor energizing circuit includes two parallel branches, one of which comprises a switch 60 operated by a solenoid 65, controlled by the follower switch 56. The other branch includes a switch 66 actuated by a solenoid 67 which is energized by the follower switch 57. The energizing circuit for the solenoid 67 includes a single-pole, double-throw switch 68, the switch arm of which is driven by the follower switch 56 in a manner to be later described. This drive is indicated by the dashed line 69.

The motor 58 drives a mechanical drive mechanism, indicated by the box 70, which has two rotational outputs, one being a coarse output indicated by the dashed line 71, and the other being a fine output indicated by the dashed line 72. The coarse output drives the 14 crystal turret 12 as indicated by the dashed line 73 and tunes the first I.F. oscillator 4 as indicated by the dashed line 74. It also repositions the follower switch 56 as indicated by the dashed line 75. The fine output tunes the tuned input and output circuits of the first I.F. amplifier 5 as indicated by the dashed lines 76 and 77. It also drives the 10 crystal selector 13 as indicated by the dashed line 78 and repositions the follower switch 57 as indicated by the dashed line 79.

The coarse and fine outputs 71 and 72 are combined in a differential mechanism indicated by the box 80, the output of which tunes the input circuit of the first intermediate power amplifier 40, tunes the input circuit of the second intermediate power amplifier 45, the input and output circuits of final power amplifier 46, the input and output circuits of R.F. amplifier 2 and the input cirmcuit of the first I.F. mixer 3 as indicated by the dashed lines 85 to 90, inclusive.

In the operation of the system described above the ganged transmit-receive switches 19, 34 and 50 are remotely operated to place the apparatus in either the transmit or receive condition. The switches are shown in position for transmission.

The frequency channel is selected by positioning the selector switch 54 to the whole megacycle position desired and the selector switch 55 to the tenth megacycle position desired. Movement of each selector will close an energizing circuit through its respective solenoid 65 or 67 in the manner described in the before mentioned Hatfield application, thus closing switches 60 and 66 energizing the motor 58. The switch 68 will simultaneously be closed in one or the other of its two positions in a manner to be described.

In order to facilitate the understanding of the operation of the system the following table of frequencies is provided by way of example:

*Crystal frequency chart*

| Whole megacycle selector setting (mc.) | First I.F. oscillator injection freq. (mc.) |
|---|---|
| 24.0 to 24.9<br>38.0 to 38.9 | 31.45 |
| 25.0 to 25.9<br>39.0 to 39.0 | 32.45 |
| 26.0 to 26.9<br>40.0 to 40.9 | 33.45 |
| 27.0 to 27.9<br>41.0 to 41.9 | 34.45 |
| 28.0 to 28.9<br>42.0 to 42.9 | 35.45 |
| 29.0 to 29.9<br>43.0 to 43.9 | 36.45 |
| 30.0 to 30.9<br>44.0 to 44.9 | 37.45 |
| 31.0 to 31.9<br>45.0 to 45.9 | 38.45 |
| 32.0 to 32.9<br>46.0 to 46.9 | 39.45 |
| 33.0 to 33.9<br>47.0 to 47.9 | 40.45 |
| 34.0 to 34.9<br>48.0 to 48.9 | 41.45 |
| 35.0 to 35.9<br>49.0 to 49.9 | 42.45 |
| 36.0 to 36.9<br>50.0 to 50.9 | 43.45 |
| 37.0 to 37.9<br>51.0 to 51.9 | 44.45 |

| Tenth megacycle selector setting (mc.) | First I.F. (mc.) | Second I.F. oscillator injection freq. (tenth-megacycle freq.) (mc.) | |
|---|---|---|---|
| For high-side injection, 24.0-37.9 mc. | | | |
| 0 | 7.45 | 10.4375 | |
| .1 | 7.35 | 10.3375 | |
| .2 | 7.25 | 10.2375 | |
| .3 | 7.15 | 10.1375 | |
| .4 | 7.05 | 10.0375 | |
| .5 | 6.95 | 9.9375 | *2.9875 |
| .6 | 6.85 | 9.8375 | |
| .7 | 6.75 | 9.7375 | |
| .8 | 6.65 | 9.6375 | |
| .9 | 6.55 | 9.5375 | |
| For low-side injection 38.0 to 51.9 mc. | | | |
| 0 | 6.55 | 9.5375 | |
| .1 | 6.65 | 9.6375 | |
| .2 | 6.75 | 9.7375 | |
| .3 | 6.85 | 9.8375 | |
| .4 | 6.95 | 9.9375 | *2.9875 |
| .5 | 7.05 | 10.0375 | |
| .6 | 7.15 | 10.1375 | |
| .7 | 7.25 | 10.2375 | |
| .8 | 7.35 | 10.3375 | |
| .9 | 7.45 | 10.4375 | |

*NOTE.—Second I.F. (mc.).

Let it be supposed that it is desired to transmit over a frequency channel of 24.4 mc. For this frequency the 31.45 mc. crystal of the turret 12 is used.

The frequency 24.0 mc. being selected on selector 54 and .4 mc. on selector 55, the coarse output of the mechanical drive will, in response to the motor rotation, move the turret 12 to switch the 31.45 mc. crystal into the circuit and the correct value of inductance for this frequency will be switched into the first I.F. oscillator circuit 4.

The fine output will operate the 10 crystal selector 13 to connect the 10.0375 mc. crystal into the circuit. This output will also drive the tuning capacitors of the input and output circuit of the first I.F. amplifier 5 to tune the same to a frequency of 7.05 mc.

The output of the differential 80 will be a summation of the coarse and fine outputs of the mechanical drive 70 and this will drive the tuning capacitors of the R.F. circuits of both transmitter and receiver to tune their respective tuned circuits to a frequency of 24.4 mc.

In the operation of the transmitter, the oscillator 28 produces an output having a center frequency of 2.9875 megacycles, frequency modulated by the audio input. This output, together with the 10.0375 mc. output of the 2nd I.F. oscillator 7 is applied to the side-step mixer 29 producing a difference frequency of 7.05 mc. which is applied through the switch 34 to the first I.F. amplifier.

The output of this amplifier is mixed in the 2nd I.F. mixer 6 with the output of first I.F. oscillator 4 at 31.45 mc. to produce the 24.4 mc. R.F. to be applied by conductor 39 to the power amplifier circuits.

For receiver operation at this frequency, with the transmit-receive switches 19, 34 and 50 in the receive position, the output of the first I.F. oscillator 4 is applied by conductor 15 to first I.F. mixer 3, there to be mixed with the incoming R.F. at 24.4 mc. The difference frequency of 7.05 mc. is amplified in the first I.F. amplifier 5 and mixed in mixer 6 with the 10.0375 mc. output of oscillator 7 applied through switch 19. The difference frequency of 2.9875 mc. is applied to the second I.F. amplifier 8 by conductor 38.

Figure 3:
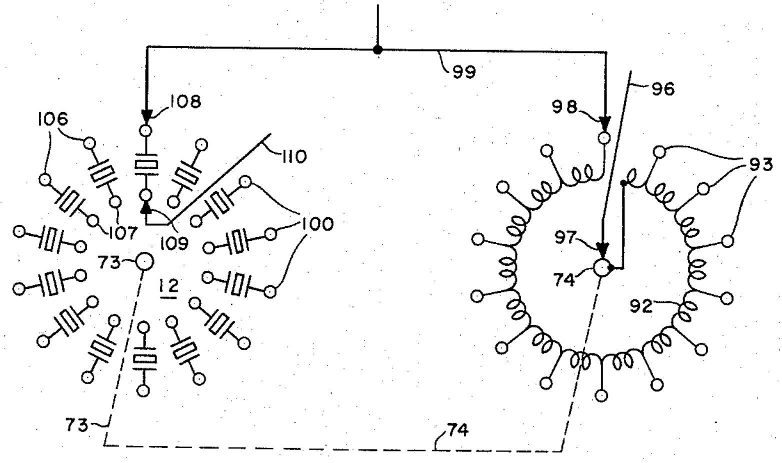
Fig. 3 is a schematic circuit diagram of the crystal turret and variable tuning inductor of the first I.F. oscillating circuit of the system.

Fig. 3 illustrates the crystal turret 12 and the variable inductor 92 of the first I.F. oscillator circuit. The inductor 92 is tapped at various points from which terminals 93 are brought out. The inductor is mounted on a rotatable shaft 74 which acts as one terminal thereof being connected into the oscillator circuit by a conductor 96 having a contact element 97 making a wiping contact therewith. The terminals 93 make wiping contact with a contacting element 98 terminating a conductor 99 forming part of the oscillator circuit.

The crystal turret has the 14 crystals 100 mounted about a central shaft 73 driven in synchronism with the shaft 74. Each crystal has two terminals 106 and 107. The terminal 106 makes wiping contact with an element 108 terminating conductor 99 while the corresponding terminals 107 make simultaneous wiping contact with an element 109 terminating a conductor 110 of the oscillator circuit.

Figure 4:
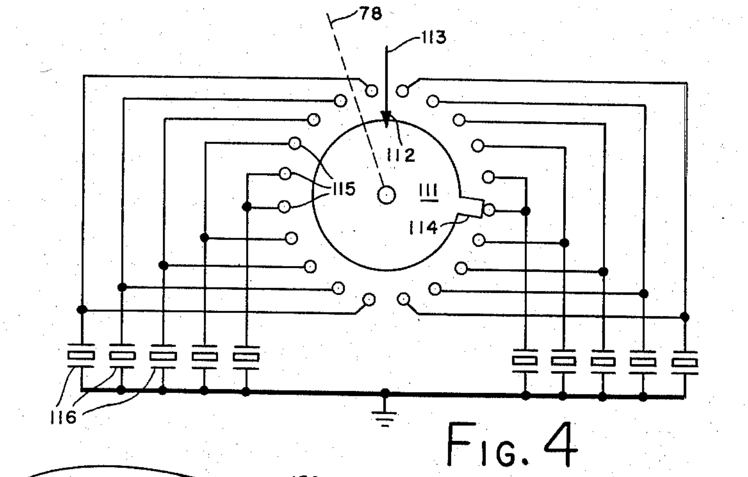
Fig. 4 is a schematic circuit diagram of the crystal selector for tenth megacycle crystals.

Fig. 4 illustrates the crystal selector 13. The shaft 78 has mounted thereon a cylindrical contact member 111 with which a contact element 112 terminating a conductor 113 makes continuous contact. A conductive tab 114 makes sequential contact with a plurality of terminals 115 as the shaft is rotated. Two of the terminals 115, symmetrically arranged about a horizontal center line, connect to one terminal of each of an array of ten crystals 116. The remaining terminals of the crystals are grounded.

The detailed illustration of the mechanical drive and differential mechanism of Fig. 2 shows the motor 58 driving a shaft 117. This shaft, through gears 118 and 119, drives a shaft 120. Mounted on this shaft is a pinion 121 meshing with spur gears 122 and 123. Spur gear 122 is mounted on the shaft 73 driving the crystal turret 12. Mounted on the shaft 73 is a pinion 124 driving a spur gear 125 mounted on a shaft 75 which drives the rotor of 28 position follower 56.

The pinion 118 also meshes with a spur gear 127 forming part of a gear train comprising pinion 128 and spur gear 129, mounted on and driving shaft 130. Mounted on shaft 130 is a bevel pinion 131 driving a bevel gear 132 mounted on fine output shaft 76. The latter drives the tuning capacitors of the input and output circuits of the first I.F. amplifier 5. A capacitor 133 with its rotor 134 mounted on the shaft is shown as a representation of the type of capacitor positioned by this shaft. The characteristics of these capacitors will be explained later. The shaft 76 continues on with an extension 78 driving the crystal selector 13.

The shaft 120 extends through gear 119 and this portion is interrupted by a friction clutch 135 and terminates in a detent plate 136 provided with four equally spaced detent notches. Coacting with these notches is a detent pin 137 actuated by a solenoid 138. The shaft 130 likewise extends through gear 129 and its remote end is likewise provided with a slipping clutch 139 and detent plate 140 provided with four notches. Detent pin 145 coacts with the notches and is driven by a solenoid 146.

The clutch and detent arrangements just referred to may be the type disclosed in U.S. patent application Serial No. 103,308, "Accurate Positioning Device," filed July 6, 1949, in the names of Radford K. Frazier and Robert P. Bennett, now Patent No. 2,702,609, issued February 22, 1955.

The solenoid 138 is connected in circuit with the selector switch 54 and its follower 56 as shown in Fig. 1 and is energized to withdraw the pin 137 as long as this switching circuit is complete.

Likewise the solenoid 146 is connected to the circuit of the selector switch 55 and its follower 57 as shown in Fig. 1 and is energized as long as this circuit is complete, to withdraw the pin 145.

The portion of the mechanism of Fig. 2 which constitutes the differential includes the gear 123. This is a wide spur gear rigidly secured to a shaft 147 for rotation therewith. Mounted on one end of the shaft 147 is a worm 148 meshing with a worm wheel 149. The worm wheel 149 drives shafts 85 to 90 which drive the rotors of the R.F. tuning capacitors of the transmitter and receiver. A capacitor 151 with its rotor 152 mounted on the shaft is shown as a representation of the type of condensers positioned thereby. The characteristics of these condensers will be discussed later.

The shaft 147 is mounted for endwise or axial movement of an extent such that there can be imparted to the gear 149 by this means, rotational movement sufficient to tune the R.F. circuits over a one megacycle range. The means for imparting this movement will now be discussed.

The shaft 76 has an extension 72 having mounted thereon a cam 150. The cam face is formed with two repetitive and identical contours, each extending over a 180° arc of the periphery. The cam face coacts with the end of shaft 147 which thus acts as a follower. The shaft is biased to contact with the cam face by means which are not shown.

It can be seen that the movement of gear 149 is a composite of the movements imparted thereto by the rotation of the shaft 147 due to the action of gear 121 and the axial movement or translation of the shaft by the cam 150 due to the rotation of shaft 72. Thus the movement of gear 149 is a summation of movements due to the coarse output and the fine output of the mechanical drive.

Due to the fact that the tuning of the R.F. circuits by the rotation of capacitor rotors is mechanically tied to the selection of crystals by a rotating mechanism which rotates twice through a 360° arc for the complete coverage of the frequency range, it is necessary to cause the active range of the tuning capacitors to be an accurate replica of this arc or a simple fraction thereof. Optimum simplicity of structure and ease of manufacture results when the capacitors are constructed for 180° of rotor travel for movement of the 28 position selector switch through its entire range.

Figure 5:
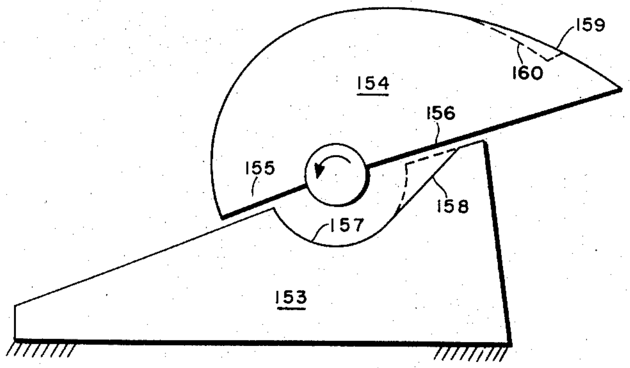
Fig. 5 is an elevational view of an R.F. tuning capacitor utilized in the system of Fig. 1.

There is shown in Fig. 5 the R.F. tuning capacitor utilized for this purpose. It comprises a stator 153 and a rotor 154. In order to provide 180° meshing, the arcuate sector through which the rotor plate extends, is somewhat in excess of 180° so that the short straight edge 155 of the rotor is not a continuation of the long straight edge 156.

During the last part of the meshing travel, before the long lobe of the rotor is completely meshed, the short lobe will begin to emerge. In order to prevent a discontinuity in the curve of capacity the arcuate cut-out portion of the stator, which would otherwise have the profile indicated in dashed lines, is cut out so that the cut-out terminates in a line 158 tangent to the arc with which the cut-out began. To compensate for the loss of meshing area resulting from this, the long lobe of the rotor has its curved edge somewhat flattened in its terminating portion as at 159. The dashed line 160 indicates the conventional profile for such a rotor.

Since the I.F. tuning capacitors are ganged with the tenth megacycle crystal selector which rotates through a complete revolution, connecting each of its crystals twice during a revolution, it is necessary, in order to avoid complicated mechanical linkages, that the I.F. tuning capacitor have an active rotation of 360° with the curve of capacitance symmetrical about the center of this range of rotation.

A capacitor providing such action is shown in Fig. 6. The shape of the stator 161 is made essentially the same as the shape of the rotor 162 to provide the symmetrical tuning characteristic. The stator is mounted, as shown at 163, at the lower end of its long lobe in order to allow the rotor to pass through without stopping. This mounting minimizes the asymmetry of the capacitance curve.

Fig. 7 shows in more detail the switching arrangement by which the 20-position follower 57 is switched from one of its halves to the other as the 28-position follower 56 moves between high-side and low-side injection.

The follower 56 drives by a shaft 164 a circular contact element 165. A grounded terminal 166 makes continuous contact with the element 165. The periphery of the latter is recessed over 180° of its extent. A pair of terminals 167, 168 spaced by 180° make contact only with the unrecessed portion of the periphery.

The 20-position follower 57 drives a contact element 169 identical with element 165. A conductor 170 connects terminal 168 with a terminal 171 which is oppositely positioned with respect to its element 169. A conductor 172 connects the terminal 167 to a terminal 173 on the opposite side of element 169 from 171. A terminal 174 makes continuous contact with element 169 and is connected to make continuous contact with the rotor of follower 57. It is also connected to the solenoid 67 as shown.

In the operation of this circuit the element 165 provides a ground for the follower 57 throughout the range of its positions which would otherwise utilize the unwanted ten positions of its available twenty positions. It is thus forced to utilize the desired range of positions.

Fig. 7 also shows the means by which the R.F. capacitors are rotated through their unused 180° of rotation as the selector switch 54 is rotated in a clockwise direction through the highest frequency channel to the lowest. The follower 56 drives through a shaft 175 a two-to-one gear train 176 which drives a shaft 177 at half the speed of the follower. Mounted on the shaft 178 for rotation therewith is a cam 178 in the shape of a cylinder with 180° of its periphery recessed. The cam drives a follower connected to a switch arm 180 of a single-pole, double-throw switch 181. One fixed terminal 182 of this switch is grounded. The other terminal 183 is unconnected. The switch arm 180 is connected by a conductor 179 for continuous contact with the rotor of follower 56.

In the operation of this circuit, as the follower leaves the highest frequency channel position on its way to the lowest channel position, the cam follower rides up on the unrecessed portion of the cam face, forcing the switch arm 181 into contact with grounded terminal 182. This switch position will be maintained for 180° of travel of the cam 178 and for a complete follower revolution, providing for the follower during this time a ground auxiliary to that normally provided by the selector switch and thus preventing stoppage of the follower until the cam follower has ridden down from the unrecessed portion of the cam face. During this rotation of the follower 56 the R.F. capacitors will have been rotated by 180° and will be ready for their active tuning rotation.

What is claimed is:

1. A transmitting and receiving system selectively tunable to a plurality of frequency channels, comprising; a first series of piezo-electric frequency determining elements individually resonant at uniformly spaced frequencies, a second series of piezo-electric frequency determining elements resonant at frequencies uniformly spaced by an amount which is a simple fraction of the frequency spacing of the elements of said first series, means selectively switching each of the elements of said first series into said system for the production of a frequency of a respective one of said channels, means selectively switching each of the elements of said second series into said system, means actuated by the switching of an element of both of said series into said system to generate energy of a certain frequency determined by the frequency of said switched element of said second series, means responsive to the presence of the said element of said first series in said system to generate energy of the frequency to which it is resonant, means mixing energy of the last named frequency and energy having said certain frequency, means applying said mixed energy to the radio frequency translating circuits of said system, ganged tuning means for said radio frequency translating circuits, a motor for driving said ganged tuning means, means energizing said motor in response to the switching of each element of said first series into said sysem to produce a driving output therefrom sufficient to drive said ganged tuning means until said translating circuits are tuned to the frequency of said one of said channels, means energizing said motor in response to the switching of said element of said second series into said system to produce a driving output therefrom sufficient to drive said ganged tuning means until said translating circuits are tuned through a frequency increment which bears the same proportion to the frequenecy spacing of adjacent elements of said first series as the resonant frequency of said element of said second series bears to the resonant frequency of the first element of said second series, and means differentially combining said driving outputs and driving said ganged tuning means in accordance with the resultant of said differential combination.

2. A transmitting and receiving sysetm as set forth in claim 1, in which said means for differentially combining the driving outputs of said motor comprises an output shaft, a gear mounted thereon for rotation therewith, a worm driving said gear, means applying the first mentioned driving output of said motor to said worm in a sense to cause rotation thereof and means applying the second mentioned driving output of said motor to said worm in a sense to cause translation thereof.

3. Means for rotating the tuning element of a tunable resonant circuit to any one of a first set of uniformly spaced positions in response to signals from a first source and to any one of a second set of uniformly spaced positions intermediate the positions of said first set and separated by a simple fraction of the spacing there between in response to signals from a second source, comprising; a motor, means energizing said motor in response to signals from either of said sources, a pair of output shafts driven by said motor, means arresting the movement of one of said shafts when said tuning element is positioned in accordance with said signals from said first source, means arresting the other of said shafts when said tuning element is positioned in accordance with signals from said second source, a gear driving said tuning element, a worm meshing with said gear, means drivingly interconnecting said one shaft and said worm whereby rotation of said one shaft rotates said worm and means drivingly interconnecting said other shaft and said worm whereby rotation of said other shaft translates said worm along its axis.

4. Means for positioning a tuning element in accordance with signals from a pair of sources, comprising; a pair of driving means each actuated in accordance with signals from a respective one of said sources, a gear driving said element, a worm meshing with said gear, means drivingly interconnecting one of said driving means with said worm whereby said worm is rotated in response to the operation thereof to one of a plurality of preselected positions, and means drivingly interconnecting the other of said driving means with said worm whereby said worm is translated along its axis in response to the operation thereof.

5. A receiving system comprising a first series of piezo-electric frequency determining elements individually resonant at uniformly spaced frequencies, a second series of piezo-electric frequency determining elements resonant at frequencies uniformly spaced by an amount which is a simple fraction of the frequency spacing of the elements of said first series, a first intermediate frequency oscillator, a serial arrangement comprising a radio frequency amplifier, a first intermediate frequency mixer, a first intermediate frequency amplifier, a second intermediate frequency oscillator to said first intermediate frequency amplifier, said second intermediate frequency amplifier being tuned to a reference frequency, a first switching means for selectively switching individual elements of said first series into the circuit of said first intermediate frequency oscillator to determine the frequency thereof, means applying the output of said first intermediat frequency oscillator to said first intermediate frequency mixer, a second intermediate frequency oscillator, a second switching means for selectively switching individual elements of said second series into the circuit of said second intermediate frequency oscillator to determine the frequency thereof, means applying the output of said second intermediate frequency oscillator to said second intermediate frequency mixer, means operated by the switching of an element of said second series into the circuit of said second intermediate frequency oscillator to tune said first intermediate frequency amplifier to a frequency which is the difference between the frequency of the switched element and said reference frequency, said first switching means having a pair of switching positions for each of the elements of said first series, means operated when said first switching means is in one of said switching positions to tune said radio frequency amplifier to a frequency which is the sum of the frequency of the element of said first series which is in the system and the frequency to which said first intermediate frequency amplifier is tuned, and means operated when said first switching means is in the other of said switching positions to tune said radio frequency amplifier to a frequency which is the difference between the frequency of the element of said first series which is in said system and the frequency to which said first intermediate frequency amplifier is tuned.

6. A receiving system as set forth in claim 5, said second switching means including a frequency selector having one position for each of the elements of said second series, and a follower responsive to actuation by said selector to switch selected elements of said second series into said system, said follower having twice as many switching positions as said selector, and means actuated by said first switching means when the latter is in one of said pair of switching positions to cause said follower to respond to any selected position of said selector by assuming one of its switching positions thereby switching one of the elements of said second series into said system, and when said first switching means is in the other of said pair of switching positions to cause said follower to respond to the same selected position of said selector by assuming another of its switching positions, thereby switching another of the elements of said second series into said system.

7. A transmitting system comprising a first series of piezo-electric frequency determining elements individually resonant at uniformly spaced frequencies, a second series of piezo-electric frequency determining elements resonant at frequencies uniformly spaced by an amount which is a simple fraction of the frequency spacing of the elements of said first series, an oscillator tuned to a reference frequency, means modulating the frequency of said oscillator with an audio signal, a first mixer having the output of said oscillator applied thereto, a second oscillator, a first switching means for selectively switching individual elements of said second series into the circuit of said second oscillator to control the frequency thereof, means applying the output of said second oscillator to said first mixer, an intermediate frequency amplifier, means operated by the switching of an element of said second series into the circuit of said second oscillator to tune said intermediate frequency amplifier to a frequency which is the difference between the frequency of the switched element and said reference frequency, means applying the output of said first mixer to said intermediate frequency amplifier, a second mixer, means applying the output of said intermediate frequency amplifier to said second mixer, a third oscillator, a second switching means selectively switching elements of said first series into the circuit of said third oscillator to determine the frequency thereof, means applying the output of said third oscillator to said second mixer, a power amplifier, means applying the output of said second mixer to said power amplifier, said second switching means having a pair of switching positions for each of the elements of said first series, means operated when said second switching means is in one of said switching positions to tune said power amplifier to a frequency which is the sum of the frequency of the element of said first series which is in said system and the frequency to which said intermediate frequency amplifier is tuned, and means operated when said second switching means is in the other of said switching positions to tune said power amplifier to a frequency which is the difference between the frequency of the element of said first series which is in said system and the frequency to which said intermediate frequency amplifier is tuned.

8. A transmitting frequency as set forth in claim 7, said first switching means including a frequency selector having one position for each of the elements of said second series, and a follower responsive to actuation by said selector to switch selected elements of said second series into said system, said follower having twice as many switching positions as said selector, and means actuated by said second switching means when the latter is in one of said pair of switching positions to cause said follower to respond to any selected position of said selector by assuming one of its switching positions thereby switching one of the elements of said second series into said system, and when said second switching means is in the other of said pair of switching positions to cause said follower to respond to the same selected position of said selector by assuming another of its switching positions, thereby switching another of the elements of said second series into said system.

9. A transmitting and receiving system selectively tunable to a plurality of frequency channels, comprising: a first series of piezo-electric frequency determining elements individually resonant at uniformly spaced frequencies, a second series of piezo-electric frequency determining elements individually resonant at frequencies uniformly spaced by an amount which is a simple fraction of the frequency spacing of the elements of said first series, a serial arrangement comprising a radio-frequency amplifier, a first intermediate frequency mixer, a first intermediate frequency amplifier, a second intermediate frequency mixer and a second intermediate frequency amplifier, a power amplifier having its input connected to the output of said second intermediate frequency mixer, an antenna, a first intermediate frequency oscillator, a first switching means for selectively switching individual elements of said first series into the circuit of said first intermediate frequency oscillator to determine the frequency thereof, means applying the output of said first intermediate frequency oscillator to said first intermediate frequency mixer, an oscillator tuned to a reference frequency, said second intermediate frequency amplifier being tuned to the same reference frequency, means modulating said reference frequency oscillator with an audio signal, a side-step mixer, means applying the output of said reference frequency oscillator to said side-step mixer, a second intermediate frequency oscillator, a second switching means for selectively switching individual elements of said second series into the circuit of said second intermediate frequency oscillator to determine the frequency thereof, means applying the output of said second intermediate frequency oscillator to said side-step mixer, means operated by the switching of an element of said second series into the circuit of said second intermediate frequency oscillator to tune said first intermediate frequency amplifier to a frequency which is the difference between the frequency of the switched element and said reference frequency, means operated in conjunction with the switching of an element of either of said series into said system to tune said radio frequency amplifier to a frequency resulting from the combination of the frequency of the one of said first series of elements which is in the system and the frequency to which said first intermediate frequency amplifier is tuned, and ganged switching means operable to either of two positions, in one of which it connects said antenna to the input of said radio frequency amplifier, disconnects the output of said side-step mixer from the system and connects the output of said second intermediate frequency oscillator to said second intermediate frequency mixer, and in the other of which it connects said antenna to the output of said power amplifier, connects the output of said side-step mixer to the input of said first intermediate frequency amplifier, disconnects the output of said second intermediate frequency oscillator from said second intermediate frequency mixer and connects the output of said first intermediate frequency oscillator to said second intermediate frequency mixer.

10. A transmitting and receiving system comprising a first series of piezo-electric frequency determining elements individually resonant at uniformly spaced frequencies, a second series of piezo-electric frequency determining elements resonant at frequencies uniformly spaced by an amount which is a simple fraction of the frequency spacing of the elements of said first series, means in said system for generating a reference electro-magnetic wave having a fixed frequency, means for selectively switching individual elements of said first series into said system, means for selectively switching individual elements of said second series into said system, means responsive to the presence of an element of said first series in said system, to generate a first electro-magnetic wave having the frequency at which said element is resonant, means responsive to the presence of an element of said second series in said system to generate a second electro-magnetic wave having the frequency at which said element is resonant, means operable for transmitting purposes to modulate said reference frequency wave, means mixing said reference frequency wave with said second wave, means selectively amplifying the difference frequency between said mixed waves, means mixing the resultant of said amplification with said first wave, and means selectively amplifying a frequency resulting from the last mentioned mixing action, and means operable for receiving purposes to selectively amplify an incoming signal having a frequency which is the same as the last mentioned frequency, means mixing said selectively amplified signal with said first wave, means selectively amplifying a resultant of the last mentioned mixing which is the difference between said second wave and said reference frequency, means mixing the last named resultant with said second wave, means selectively amplifying the resultant of the last mentioned mixing which has said reference frequency and means demodulating the last mentioned selectively resultant.

11. A transmitting and receiving system comprising a first series of piezo-electric frequency determining elements individually resonant at uniformly spaced frequencies; a second series of piezo-electric frequency determining elements resonant at frequencies uniformly spaced by an amount which is a simple fraction of the frequency spacing of the elements of said first series; means for selectively switching individual elements of said first series into said system; switching means for selectively switching individual elements of said second series into said system; means responsive to the presence of an element of said first series in said system to generate a first electro-magnetic wave having the frequency at which said element is resonant; means responsive to the presence of an element of said second series in said system to generate a second electro-magnetic wave having the frequency at which said element is resonant; a serial arrangement comprising a radio frequency amplifier, a first intermediate frequency mixer, a first intermediate frequency amplifier, a second intermediate frequency mixer, and a second intermediate frequency amplifier; a fixed frequency oscillator; said second intermediate frequency amplifier being tuned to the same frequency as said fixed frequency oscillator, radio frequency power amplifying means having applied thereto the output of said second intermediate frequency mixer; an antenna; means connecting said antenna to the output of said power amplifying means for transmitting purposes; means connecting said antenna to said radio frequency amplifier for receiving purposes; and means mixing the output of said fixed frequency oscillator with one of said electro-magnetic waves in a manner such that, when said antenna is connected to said radio frequency amplifier and a signal of the frequency developed at said second intermediate frequency amplifier for transmission purposes is being received, one of the output frequencies of said second intermediate frequency mixer is the frequency of said fixed frequency oscillator.

References Cited in the file of this patent

UNITED STATES PATENTS

| | | |
|---|---|---|
| 1,878,639 | Lofgren | Sept. 20, 1932 |
| 2,313,429 | Goddard | Mar. 9, 1943 |
| 2,419,593 | Robinson | Apr. 29, 1947 |
| 2,487,857 | Davis | Nov. 15, 1949 |
| 2,501,591 | Bach | Mar. 21, 1950 |
| 2,529,443 | Bach | Nov. 7, 1950 |
| 2,539,537 | Harley et al. | Jan. 30, 1951 |
| 2,544,918 | Demeulenaere et al. | Mar. 13, 1951 |
| 2,567,860 | Shapiro | Sept. 11, 1951 |
| 2,645,321 | May et al. | July 14, 1953 |
| 2,653,222 | Williams et al. | Sept. 22, 1953 |
| 2,654,832 | Robinson | Oct. 6, 1953 |
| 2,692,943 | Reid | Oct. 26, 1954 |